(12) United States Patent
Manyam et al.

(10) Patent No.: US 7,167,621 B2
(45) Date of Patent: Jan. 23, 2007

(54) OPTICAL FIBER WITH SUPPRESSED STIMULATED BRILLOUIN SCATTERING AND METHOD FOR MAKING SUCH A FIBER

(75) Inventors: Upendra H. Manyam, Weatogue, CT (US); Kanishka Tankala, South Windsor, CT (US); Nils Jacobson, North Granby, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/981,437

(22) Filed: Nov. 3, 2004

(65) Prior Publication Data

US 2006/0093294 A1     May 4, 2006

(51) Int. Cl.
*G02B 6/02* (2006.01)
*G02B 6/00* (2006.01)

(52) U.S. Cl. ........................ 385/123; 385/126

(58) Field of Classification Search ............... None
See application file for complete search history.

(56) References Cited

U.S. PATENT DOCUMENTS

| | | |
|---|---|---|
| 5,170,457 A | 12/1992 | Jen |
| 5,848,215 A | 12/1998 | Akasaka et al. |
| 5,851,259 A | 12/1998 | Clayton et al. |
| 6,542,683 B1 | 4/2003 | Evans et al. |
| 6,587,623 B1 | 7/2003 | Papen et al. |
| 6,687,440 B2 | 2/2004 | Balestra et al. |
| 2001/0008077 A1* | 7/2001 | Berkey ................... 65/403 |
| 2001/0019642 A1 | 9/2001 | Krummrich |
| 2004/0037529 A1 | 2/2004 | Balestra et al. |
| 2005/0226580 A1* | 10/2005 | Samson et al. ............ 385/127 |

FOREIGN PATENT DOCUMENTS

EP    0 839 770 B1    4/2000

(Continued)

OTHER PUBLICATIONS

Jen et al.; "Role of guided acoustic wave properties in single-mode optical fibre design"; Electronics Letters, Nov. 10, 1988; vol. 24, No. 23, pp. 1419-1420.

(Continued)

*Primary Examiner*—Sung Pak
(74) *Attorney, Agent, or Firm*—Peter J. Rainville

(57) ABSTRACT

An optical fiber for the transmission of electromagnetic energy, where the fiber can have increased input power threshold for the onset of Stimulated Brillouin Scattering (SBS). The fiber can comprise a core and a cladding disposed about the core. The core can have a distribution of velocities for an acoustic wave associated with SBS, where the distribution of propagation velocities of the core for the acoustic wave is at least one of a) azimuthally asymmetric or b) non-constant in an azimuthal plane and longitudinally asymmetric. The fiber can be longitudinally asymmetric wherein the core includes a first portion having a propagation velocity for the acoustic wave that is substantially the same throughout interposed between longitudinally spaced portions each having a propagation velocity different than that of said first portion. Methods, such as, for example, methods for fabricating and/or using a fiber having an increased threshold input power for the onset of SBS, are also disclosed.

62 Claims, 4 Drawing Sheets

FOREIGN PATENT DOCUMENTS

| | | |
|---|---|---|
| JP | 1004709 | 1/1989 |
| JP | 1129207 | 5/1989 |
| JP | 10096828 | 4/1998 |
| WO | WO 98/18219 | 4/1998 |
| WO | WO 99/04298 | 1/1999 |
| WO | WO 02/14920 A1 | 2/2002 |

OTHER PUBLICATIONS

Ohashi et al.; "Design of Strain-Free-Fiber (. . .) for Stimulated Brillouin Scattering Suppression"; J. of Lightwave Technology, vol. 11, No. 12, Dec. 1993, pp. 1941-1945.

Agrawal; "Stimulated Brillouin Scattering"; Nonlinear Fiber Optics Second Edition 1995; Academic Press Limited, London, UK; Chapter 9, pp. 370-403.

Shiraki et al.; "Suppression of stimulated Brillouin scattering in a fibre by changing the core radius"; Electronics Letters, Apr. 13, 1995; vol. 31, No. 8, pp. 668-669.

Grimalsky et al.; "Dynamic Effects of the stimulated Brillouin scattering in fibers due to acoustic diffraction"; J. Opt. Soc. Am. B; vol.19, No.4; Apr. 2002, pp. 689-694.

Lee et al.; "Suppression of stimulated Brillouin scattering in optical fibers using fiber Bragg gratings"; Optics Express; vol. 11, No. 25; Dec. 15, 2003, pp. 3467-3472.

Machewirth et al.; "Large Mode Area Double Clad Fibers for Pulsed and CW Lasers and Amplifiers"; Proceedings of SPIE vol. 5335, Jan. 26-28, 2004, pp. 140-150.

Wessels et al.; "Novel suppression scheme for Brillouin scattering"; Optics Express; vol. 12, No. 19; Sep. 20, 2004, pp. 4443-4448.

\* cited by examiner

OPTICAL FIBER WITH SUPPRESSED STIMULATED BRILLOUIN SCATTERING AND METHOD FOR MAKING SUCH A FIBER

FIELD OF THE INVENTION

The invention relates to optical waveguides for the transmission of electromagnetic energy, such as, for example, the delivery of light beams to a work object, and deals more particularly with optical fibers used to transmit electromagnetic energy at such high levels of power that Stimulated Brillouin Scattering (SBS) may be of importance.

BACKGROUND OF THE INVENTION

SBS can impose a practical upper limit on the amount of useful power that can be transmitted by an optical waveguide, such as an optical fiber. Without wishing to be bound by any particular theory, SBS is understood to be a non-linear acousto-optic effect wherein responsive to electromagnetic energy propagating in the forward direction, electromagnetic energy is scattered in the backward direction accompanied by the release of phonon energy. The backward propagating electromagnetic energy is down shifted in frequency from the forward propagating electromagnetic energy.

SBS leads to a drop in transmission efficiency above a threshold input power, as is well understood in the art. Once the threshold input power has been reached, launching additional power in the forward direction results in little or no increase in power being transmitted the forward direction; most or all of the additional input power is scattered in the backward direction. The SBS threshold power can depend on the fiber length and the power density. The build-up of SBS is greater at longer lengths. Similarly, a smaller core size increases the power density and hence quickens the onset of SBS. SBS can limit one or both of the amount of power that can be transmitted as well as the distance over which a given amount of power can be transmitted. SBS is particularly severe for the transmission of electromagnetic energy having a narrow line width, such as is often provided by laser sources. For example, major industrial laser systems currently transmit 4–5 kW of Nd-YAG power over about a 50 meter length of fiber. It can be difficult to transmit such power levels over more than 50 meters. One of the factors limiting the length is SBS.

The limitations that SBS can impose on the transmission of electromagnetic energy over optical fibers is well known, and various forms or constructions of fiber have been proposed in the past with the aim of reducing or suppressing the SBS phenomenon. Examples of such fiber constructions are disclosed in U.S. Pat. Nos. 5,170,457; 5,848,215, 6,542,683 B1; 6,687,440 B2 and 6,587,623 B1; in U.S. Patent Application Publication Nos. 2001/0019642 A1 and 2004/0037529 A1; and in Japanese Patent Numbers 1004709; 1129207 and 10096828.

While some of the foregoing applications or patents may describe fibers that represent an improvement in the art, each can have drawbacks or limitations in certain circumstances. Accordingly, it is an object of the present invention to provide methods and apparatus that address one or more of the drawbacks or deficiencies of the prior art. Other objects will be apparent below, or from practice of the invention as taught herein.

SUMMARY OF THE INVENTION

In one aspect, the invention can include being able to deliver higher power electromagnetic energy, such as in the form of laser beams, to longer distances than currently possible, by increasing the threshold power for onset of Stimulated Brillouin Scattering (SBS). The threshold power can be increased by addressing the fundamental mechanism of the SBS generation phenomenon and taking steps to minimize the creation of the scattered wave. The invention can provide an optical fiber having a reduced transmission loss due to SBS. While different techniques may exist for measuring or ascertaining the exact amount of loss due to SBS or the exact SBS threshold, most techniques should be in agreement as to qualitative and/or as to a relative quantitative improvements.

In another aspect, the invention can provide an optical fiber for the transmission of electromagnetic energy and having a longitudinal axis. The fiber can comprise a core and a cladding disposed about the core. The core can have a distribution of velocities for an acoustic wave associated with SBS, where the distribution of propagation velocities of the core for the acoustic wave is at least one of a) azimuthally asymmetric or b) non-constant in an azimuthal plane and longitudinally asymmetric. The fiber can be longitudinally asymmetric wherein said core includes a first portion having a propagation velocity for the acoustic wave that is substantially the same throughout interposed between longitudinally spaced portions each having a propagation velocity different than that of said first portion. The fiber can have an increased input power threshold for the onset of SBS.

The distribution of propagation velocities can be azimuthally asymmetric, and can, in some embodiments, also be either longitudinally asymmetric or longitudinally symmetric. The distribution of propagation velocities of the core for the acoustic wave can be longitudinally asymmetric, and can, in some embodiments, also be either azimuthally asymmetric or azimuthally symmetric. In certain embodiments wherein the propagation velocity distribution is longitudinally asymmetric, the first portion is contiguous with the longitudinally spaced portions. The core of the fiber can have a base material having a first propagation velocity for the acoustic wave.

The core can have a diameter that remains substantially the same along the longitudinal axis. The fiber can have a relative optical index of refraction profile representative of the core relative to the cladding, and the relative optical index of refraction profile can be longitudinally symmetric. At least one of the core and the cladding can have an optical index of refraction that does not substantially vary along the longitudinal axis. The core can have an optical index of refraction that is substantially the same throughout the volume of the core.

The propagation velocity distribution can be formed at least in part by the asymmetrical transfer of thermal energy with the preform from which the fiber is drawn. If the fiber is drawn from a preform, the velocity distribution can be formed at least in part by twisting at least one of the preform and the fiber. The twisting can take place during draw. The fiber can have a twist imparted after draw.

The optical fiber can comprise a plurality of longitudinally extending portions, where each of the portions has a propagation velocity of the acoustic wave that is different than the propagation velocity for the acoustic wave of the fiber material contiguous with the portion. The longitudinally extending portions can have a distance between them. An acoustic phonon damping distance can be associated with SBS, and the portions can have a distance between them that is less than or equal to the damping distance. The distance can be can less than or equal to 500 microns; less than or equal to 250 microns; or less than or equal to 100 microns.

The invention can also include methods.

In one aspect, the invention provides a method for providing an optical fiber having an increased input power threshold for the onset of SBS. The method can include providing a preform having at least a core part; drawing a fiber from the preform, where the fiber has a core corresponding to the core part of the preform and a longitudinal axis; and providing in the core a distribution of propagation velocities for an acoustic wave associated with SBS, where the distribution is at least one of a) azimuthally asymmetric or b) non-constant in an azimuthal plane and longitudinally asymmetric. The fiber can be longitudinally asymmetric wherein said core includes a first portion having a propagation velocity for the acoustic wave that is substantially the same throughout interposed between longitudinally spaced portions each having a propagation velocity that is different than that of said first portion. The fiber can have an increased input power threshold for the onset of SBS.

The distribution of propagation velocities can be azimuthally asymmetric, and can, in some embodiments, also be either longitudinally asymmetric or longitudinally symmetric. The distribution of propagation velocities of the core for the acoustic wave can be longitudinally asymmetric, and can, in some embodiments, also be either azimuthally asymmetric or azimuthally symmetric.

Providing the distribution of propagation velocities can include transferring thermal energy with one or both of the preform or the fiber in at least one of an azimuthally or longitudinally asymmetric manner. Transferring thermal energy can include heating or cooling. Transferring thermal energy can include providing a flow of gas that impinges the fiber or the preform. The flow of gas can be pulsed. Transferring thermal energy can include heating the preform for drawing the fiber from the preform.

Providing the distribution of propagation velocities can include twisting one or both of the preform and the fiber. The rate of twist can be varied as the fiber is drawn. The direction of twist can be reversed. Providing the distribution of propagation velocities can include one or more of varying the cooling rate of the fiber drawn from the preform; offsetting the fiber being drawn from the center of a furnace aperture; or drawing the fiber using a draw furnace having a varying wall thickness when viewed in a cross section substantially perpendicular to a longitudinal axis of the fiber.

The core part of the preform can comprise a base material and have a longitudinal axis, and providing a distribution of propagation velocities can include providing the core part with a plurality of longitudinally extending portions surrounded by the base material, the longitudinally extending portions having a different propagation velocity for the acoustic wave than the base material. The fiber can have a diameter that remains substantially the same along the length of the fiber. The core can have an optical index of refraction that is substantially the same throughout the volume of the core. The optical index of refraction of the core can be substantially longitudinally symmetric.

In another aspect, the invention can provide a method for making an optical fiber having an increased input power threshold for the onset of SBS. The method can include providing a preform having at least a core part; drawing a fiber from the preform, the fiber having a core corresponding to the core part of the preform; and asymmetrically transferring thermal energy with at least one of the preform or the fiber. The fiber can have an increased input power threshold for the onset of SBS.

In yet an additional aspect, the invention can provide a method for transmitting electromagnetic energy with an optical waveguide so as to reduce the detrimental effects of SBS on the transmission of electromagnetic energy by the optical fiber. The method can include drawing a length of optical fiber; twisting at least one of the optical fiber or a preform from which the optical fiber is drawn; providing input electromagnetic energy having an input power to the length of optical fiber for transmission by the optical fiber such that the optical fiber can provide an output electromagnetic energy having an output power, where the output power is higher that it would be for the same input power if the step of twisting were not performed.

The input electromagnetic energy can have an input power that is higher than the input power threshold for the onset of SBS for a second length of fiber substantially identical to the length of fiber except that the twisting step is omitted. The input power can be a least 1.5 times higher, at least 2 times higher, or at least 5 times higher than the input power threshold for the onset of SBS of the second length of fiber.

Stating herein that one region of a fiber, such as a cladding, has or includes a lower refractive index or index of refraction than another region of a fiber, such as a core, means generally that the region will guide electromagnetic energy if it were to be surrounded by the another region (e.g., the core guides electromagnetic energy when clad by the cladding). One example is a optical fiber wherein the core and cladding are both formed from a similar material (e.g., silica glass), and one or both of the core and the cladding include material such that the optical index of refraction of the glass of the cladding is less than the optical index of refraction of the glass of the core. For example, the core can include germanium, which raises the optical index of refraction of the silica, and the cladding can consist essentially of silica glass. Also included in the definition of one region having a lower optical index of refraction than another region are regions that are designed to be microstructured, holey, photonic bandgap, as well as other designs that can allow for guiding of electromagnetic energy. For example, in certain fiber designs, all or some materials of the regions can in fact have substantially the same optical index of refraction (e.g., variation of no greater than 0.001 can be considered uniform or substantially the same in many instances). However, one of the regions can have been modified to have a lower effective index of refraction by including air holes to provide a lower average index of refraction or to provide a selected photonic bandgap. One of the regions can be disposed about the other of the regions such that electromagnetic energy can be guided. Such designs are within the scope of the present invention, and within the meaning of one region being stated herein to have a lower index of refraction than another of the regions, as provision is made for guiding of electromagnetic energy. "Refractive index" or "index of refraction", when used herein, means optical index of refraction, unless it is clear that a different meaning (e.g., acoustic index of refraction) is intended.

Several features of the invention are described above and elsewhere herein. Not every specific combination of features according to which the invention can be practiced is explicitly enumerated herein. In general, it is understood by one of ordinary skill in the art that features described in conjunction with one embodiment can be included in any other embodiment described herein, excepting of course combinations of features that are mutually exclusive.

Further advantages, novel features, and objects of the invention will become apparent from the following detailed description of non-limiting embodiments of the invention when considered in conjunction with the accompanying FIGURES. For purposes of clarity, not every component is labeled in every one of the following FIGURES, nor is every component of each embodiment of the invention shown where illustration is not considered necessary to allow those of ordinary skill in the art to understand the invention.

DETAILED DESCRIPTION OF THE PREFERRED EMBODIMENTS

Figure 1:
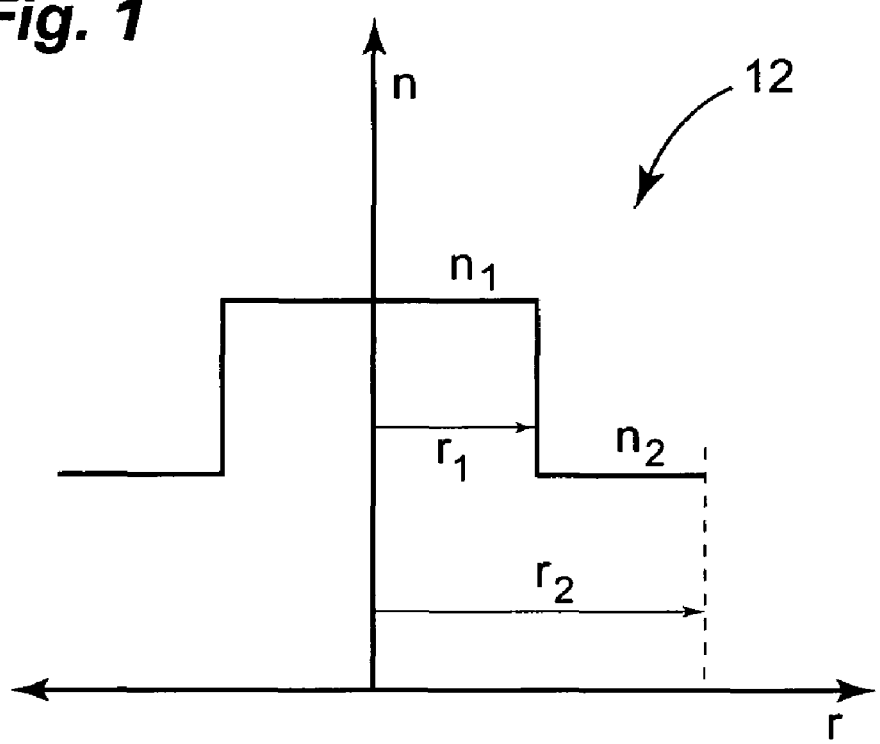
FIG. 1 illustrates the refractive index profile of one embodiment of an optical fiber according to the present invention.

SBS can be described classically as a parametric interaction of a pump wave (e.g., the forward propagating electromagnetic energy launched at the input end of an optical fiber), a Stokes wave, and an acoustic wave. The input electromagnetic energy generates an acoustic wave through the process of electrostriction which in turn causes a periodic modulation of the optical refractive index (e.g., a grating). The grating scatters the input electromagnetic energy via the process of Bragg diffraction back toward the input. The scattered electromagnetic energy is down shifted in frequency because of a Doppler shift associated with the grating, which moves at an acoustic velocity. The same scattering process can also be viewed quantum mechanically as if annihilation of a photon of the input electromagnetic energy creates a Stokes photon and an acoustic phonon simultaneously. Due to the nature of the scattering process, the Stokes wave is down shifted in frequency and the maximum Stokes intensity is in the backward direction. "Acoustic", as used herein, refers to a wave phenomenon (e.g., a longitudinal wave or a shear wave) understood by those of ordinary skill in the art to be related to SBS, and is not to be limited in the sense of relating only to sounds heard by humans.

The downward frequency shift $v_B$ of the scattered optical wave is inversely proportional to the wavelength of the transmitted or pump electromagnetic energy. In bulk silica, $v_B$ is approximately 16.2 GHz at 1.06 μm. The Brillouin gain spectrum is Lorentzian in shape, with the peak gain coefficient $g_B$ given by $$g_B(v_B) = \frac{2\pi n^7 p_{12}^2}{c\lambda_P^2 \rho_0 v_A \Delta v_B} \quad (1)$$

where n is the index of refraction at the pump wavelength $\lambda_p$, $p_{12}$ is the longitudinal elasto-optic coefficient, $\rho_0$ is the material density, $v_A$ is the acoustic velocity and $\Delta v_B$ is the full width at half maximum (FWHM) gain line width of the Brillouin spectrum. The gain line width $\Delta v_B$ is inversely proportional to the acoustic phonon lifetime $T_B$. The peak gain coefficient $g_B$ is nearly independent of wavelength because the gain line width $\Delta v_B$ also follows an inverse square relation with wavelength. For bulk silica, the peak gain coefficient $g_B$ is around $5\times10^{-11}$ m/W. In optical fiber, this value varies with the composition and index profile, as well as the acoustic guiding characteristics. Typical index variations between the core and cladding of an optical fiber can result in $n^7$ being lowered by a factor of 10–15%. However, the index levels are often restricted by other optical considerations of the transmission system. Typical compositional differences result in small changes in density and acoustic velocity. The Brillouin gain also depends on the pump source line width. In case of a Lorentzian pump spectrum of width $\Delta v_p$, the peak gain coefficient is given by $$\tilde{g}_B = \frac{\Delta v_B}{\Delta v_B + \Delta v_P} g_B(v_B) \quad (2)$$

One way to lower the gain coefficient is to change the spectral format of the pump source (e.g., broaden $\Delta v_p$). Often, it may not be possible to change the spectral format, or the power throughput is too high even at fairly high values of $\Delta v_p$. Hence, options are useful that improve the gain coefficient of the fiber itself, rather than controlling the source. From equation 1, one way to minimize SBS is to lower the gain coefficient $g_B$ by broadening the gain spectrum line width $\Delta v_B$, or lowering the elasto-optic coefficient $\rho_0$, or by both of the foregoing.

FIG. 1 shows the refractive index profile 12 of one embodiment of an optical fiber of the present invention. The refractive index profile is similar to that of many conventional fibers. In FIG. 1, $n_1$ and $n_2$ are the index of refraction, and $r_1$ and $r_2$ are the radii, of the core and cladding respectively. The numerical aperture (NA) can be calculated as $\sqrt{n_1^2 - n_2^2}$ for the step index refractive index profile 12. Typical NA values for a fiber of the invention used as a beam delivery fiber can range from 0.12 to 0.26, though fibers with higher NA up to 0.6 are also possible. The refractive index profile 12 is exemplary, as well as idealized. As is known in the art, there is wide range of refractive index profiles which are used for optical fibers. The refractive index profile is idealized in that it can include the signature "center dip" (not shown) if the fiber is made using the Modified Chemical Vapor Deposition (MCVD) process.

The core and cladding of a fiber according to the invention preferably comprise pure silica or doped silica. The core can be either undoped, or doped, for example, with one or more of aluminum, germanium, phosphorous and/or fluorine as dopants. Similarly, the cladding can be either undoped silica, or, for example, silica doped with fluorine and/or boron, among others. A part of a fiber, such as the cladding, can be of a photonic bandgap or holey design, or can include voids that macroscopically reduce the effective index of refraction by lowering the average index of refraction of the region including the voids.

In one embodiment of the invention, an acoustic wave associated with SBS is disrupted by providing the fiber (e.g., the core of the fiber) with acoustic properties that vary, such as by being different for different portions of the fiber (e.g., different portions of the core). Typically, an acoustic property is non-constant (meaning that it is not substantially the same, where "substantially" allows for manufacturing variations and the like) in a cross sectional plane taken perpendicular to the longitudinal axis of a fiber. Preferably, the acoustic property that varies includes the propagation velocity for an acoustic wave associated with the SBS phenomenon. The variation in propagation velocity can be more continuous or more discrete, where discrete implies that it is easier to identify a geometric perimeter of a portion or region wherein in crossing the perimeter the propagation velocity makes a more substantial change. Whether a variation is embodied in a more discrete or more continuous fashion, however, the fiber is considered in either case to have a distribution of propagation velocities that can help delay the onset of SBS. Preferably, there is an appropriate variation of the acoustic property over typical phonon propagation distances.

The aforementioned dopant concentration can be substantially the same radially within the core, and similarly within the cladding. This corresponds to existing dopant concentration profiles, and the SBS suppression of the invention is induced by means other than compositional grading.

A fiber is typically drawn from a solid preform, though "preform", as that term is used herein, is intended to include a crucible-type arrangement wherein a fiber is drawn from a mass of viscous material through an appropriate aperture or set of apertures. Draw conditions can be controlled such that deformations (e.g., microstructural deformations) are introduced into the fiber, where the deformation can cause a change in an acoustic property. The draw process leaves a certain stress distribution in the fiber, which depends on compositional gradation in the preform and draw process parameters, such as temperature (e.g., rate of heating or cooling), tension, fiber draw speed and the like. By selecting or varying certain draw process parameters, deformations can be induced in the glass in a controlled manner. The magnitude and frequency of the deformation can be controlled by the rate at which one or more process parameters are changed.

The process variations can result in a differential rate of change of acoustic refractive index of the glass that, at least in some cases, would not significantly affect the optical properties, but at the same time, disrupt an acoustic wave, resulting in SBS suppression. Different portions of the optical fiber can have different propagation velocities for an acoustic wave associated with SBS. The optical and/or physical properties of the fiber, in certain practices of the invention, can remain substantially the same. Substantially the same, in this context, means that optical properties and/or physical properties at issue in a particular intended use of the optical fiber are not so changed so as to be a significant detriment to the intended use. For example, azimuthally asymmetrically heating the preform with the draw furnace (described below) could, in theory at least, cause some non-circularity in the fiber, which can increase the polarization mode dispersion (PMD) of the fiber, and PMD may be of importance in a particular application. For the optical property of PMD to be considered substantially the same, it should not be increased to the point where the fiber is unsuitable for its intended use.

The term "transfer of thermal energy with" is used herein to include both heating and cooling. Transfer of thermal energy with an optical fiber or preform can be asymmetrical, such as by being, for example, one or both of azimuthally or longitudinally asymmetrical. Azimuthally, as used herein, refers to a cross sectional plane taken substantially perpendicular to a longitudinal axis of a fiber or preform. Azimuthally asymmetrical means that, for the feature at issue, the feature does not remain substantially the same when considered as a function of a radial vector constrained to the cross sectional plane and that is varied by sweeping the vector through all of the azimuthal range of 360 degrees. (Conversely, azimuthally symmetric means that the feature does remain substantially the same.) "Substantially" allows for typical manufacturing variations and the like. In regards to the transfer of thermal energy with the fiber or preform, longitudinally asymmetrical means that the overall thermal treatment of the fiber or preform is not substantially the same for the longitudinal locations in question along the fiber or preform. The terms "light" or "optical", as used herein, are used broadly as understood by one or ordinary skill in the art of optical waveguides, and are not to be limited as pertaining only to the visible range of wavelengths.

Figure 2A:
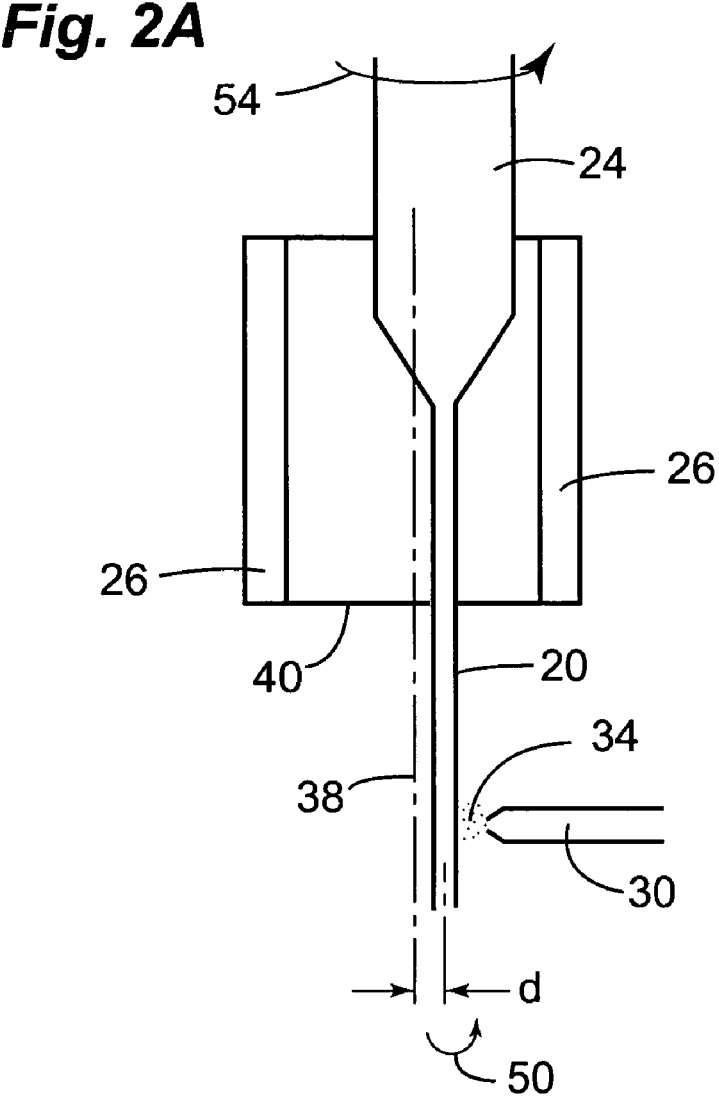
FIG. 2A schematically illustrates an optical fiber being drawn from a preform.

Consider FIG. 2A, which schematically illustrates an optical fiber 20 being drawn from the preform 24. The heater walls 26, which in one type of heater are heated by the passage of electric current therethrough, heat an end of the preform 24 such that the optical fiber 20 can be drawn from the preform 24. The nozzle 30 can provide a gas, indicated by reference numeral 34, that transfers thermal energy with the fiber 20. In one practice, the gas cools the fiber 20. Note that in the embodiment of the invention shown in FIG. 2A, the gas impinges the fiber 20 in an azimuthally asymmetric manner. The transfer of thermal energy is therefore considered to be azimuthally asymmetric, unless nozzles are arranged to provide an azimuthally symmetric transfer.

A flow of gas can be pulsed and the frequency and intensity of the pulse can be periodic, random or follow a certain programmed time function to give the desired stress and/or deformational variations. If the gas flow is appropriately pulsed, the transfer of thermal energy with the fiber can be longitudinally asymmetric, as those locations along the length of the fiber 20 that experience the pulse experience a cooling rate that is enhanced relative to other longitudinal locations along the length of the fiber 20 that do not experience the pulse.

Figure 2B:
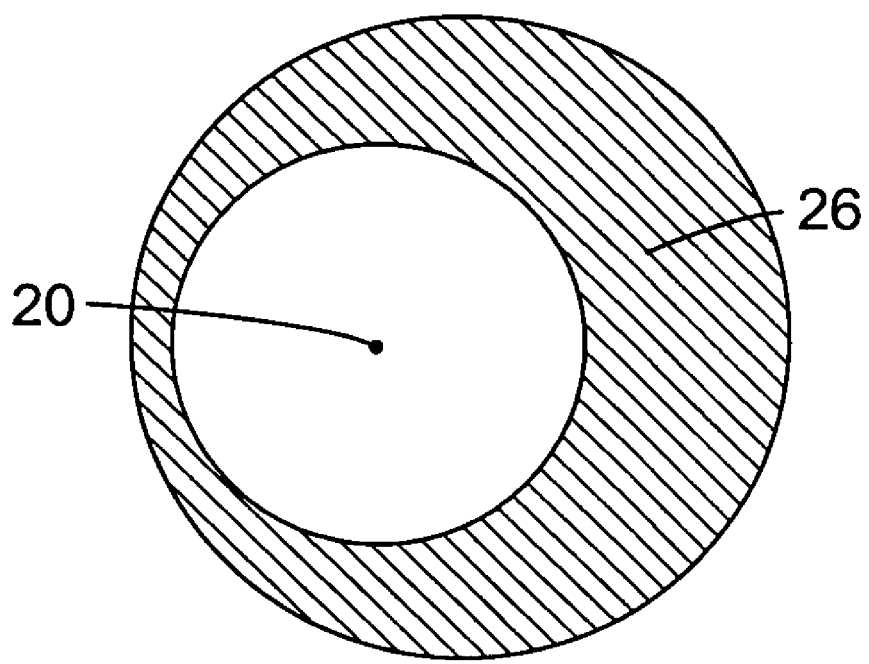
FIG. 2B shows a cross section of one embodiment of a heater or furnace for heating a preform for drawing an optical fiber.

In one embodiment of the invention, the fiber 20 can be drawn such that the fiber 20 is offset, such as by the distance d, from a longitudinal axis passing through the center of the outlet aperture 40 of the heater. Alternatively or additionally, the furnace can be designed such that the wall-thickness of the furnace or heater varies, which varies the resistance, and hence the heating, provided by different portions of the wall 26. See FIG. 2B, which shows a cross section of the heater. The fiber 20 can be located as shown. Both of the foregoing heater arrangements are examples of an azimuthally asymmetric transfer of thermal energy with the one or both of the preform 24 and the fiber 20.

In another embodiment of the invention, twisting one or both of the preform 24 or the fiber 20, preferably during draw, can provide distribution of propagation velocities. Portions of the fiber can have different propagation velocities for an SBS related acoustic wave. Spinning can further randomize the distribution of existing portions, such as portions formed by the asymmetrical transfer of thermal energy noted above. Reference numeral 50 indicates twisting of the fiber 20 and reference numeral 54 indicates twisting of the preform 24. The rate of twisting can vary periodically or according to some time function so that acoustic phenomena, such as an acoustic wave, are disrupted. The twisting can reverse direction. A fiber can have a twist imparted after draw, such as when being installed in an apparatus.

Figure 3B:
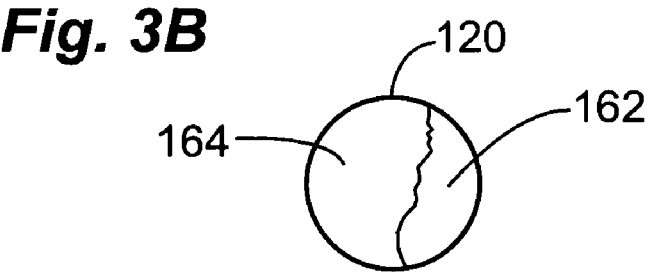
FIG. 3B is an azimuthal cross section of the fiber of FIG. 3A taken along section lines 3B—3B.
Figure 3A:
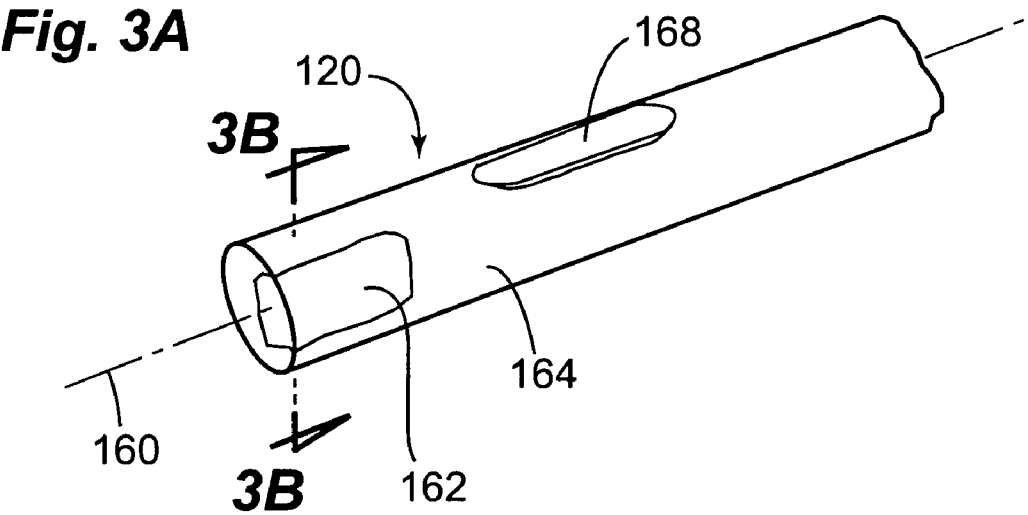
FIG. 3A is a perspective view of a length of optical fiber according to one embodiment of the invention.

FIG. 3A is a perspective view of a length of optical fiber 120 wherein the asymmetrical transfer of thermal energy with the fiber 120 and/or the above-described twisting have resulted in the fiber 120 having a first portion 162 that includes a different propagation velocity for an acoustic wave associated with SBS than a propagation velocity for the acoustic wave included by a second portion 164 of the fiber. The optical fiber 120 can also include a third portion 168 having a propagation velocity that is different than the propagation velocity included by the second portion 164. The core of the fiber 120 can include the first, second and third portions, 162, 164 and 168, respectively. Note that the third portion 168 is longitudinally spaced from the first portion 162. The second portion 164 is interposed between the first and third portions, 162 and 168, respectively, and can be contiguous with the second portion, as shown in FIG. 3A. In certain practices of the invention, such as where most or all of a change in propagation velocity is due to the asymmetric transfer of thermal energy, the portion 164 can represent the base material (e.g., material wherein the propagation velocity is largely unaffected by the asymmetric thermal transfer or other expedient that affects regions 162 and 168).

FIG. 3B is an azimuthal cross section of the fiber 120 taken along section lines 3B—3B of FIG. 3A, showing the first and second portions, 162 and 164, respectively, having different propagation velocities.

In general, a distribution of propagation velocities of a core or other part of a fiber can be azimuthally asymmetric and one of longitudinally asymmetric or longitudinally symmetric, or longitudinally asymmetric and one of azimuthally asymmetric or azimuthally symmetric. "Longitudinally asymmetric" means the distribution of propagation velocities for an acoustic wave associated with SBS, considered in a cross-sectional plane substantially perpendicular to a longitudinal axis of the fiber or preform, is not substantially the same for different locations along the length of the fiber or preform, where "substantially" allows for typical manufacturing and like variations. "Longitudinally symmetric" is the converse of longitudinally asymmetric—the distributions at different cross section planes are the substantially the same. Typically, the distribution of propagation velocities will be non-constant when considered in a cross sectional plane taken perpendicular to the length of the fiber or preform, meaning that the propagation velocity is not substantially the same for all locations in the cross sectional plane.

The fiber 120 of FIGS. 3A and 3B has a propagation velocity distribution that is both longitudinally and azimuthally asymmetric, as can be appreciated by one of ordinary skill in the art, based on the disclosure herein.

Figure 4:
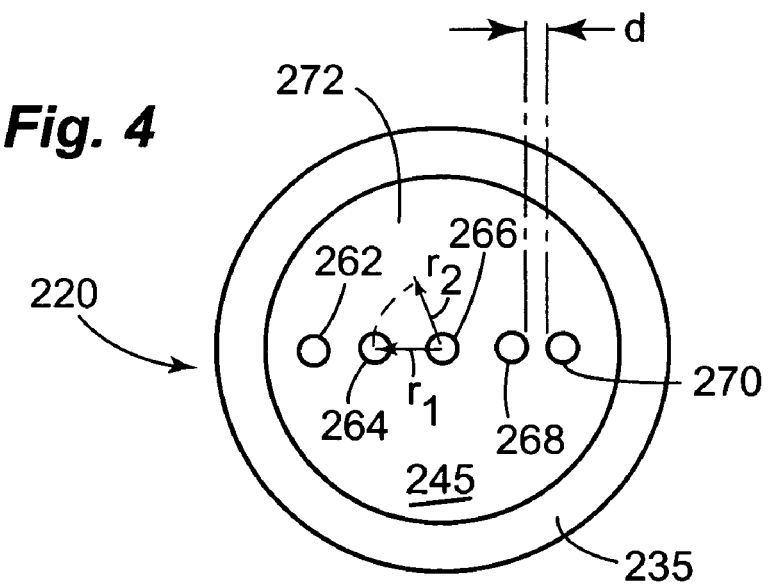
FIG. 4 is an azimuthal cross section of another embodiment of an optical fiber according to the present invention.

FIG. 4 illustrates a cross section of another embodiment of an optical fiber 220 according to the present invention. The optical fiber 220 includes a cladding 235 disposed about a core 245. The core 245 comprises a plurality of longitudinally extending "scattering" portions 262, 264, 266, 268, 270, wherein each of the foregoing portions includes a propagation velocity, for an acoustic wave associated with SBS, that is different from the propagation velocity of the core material (indicated in FIG. 4 as core portion 272) that is contiguous with each of plurality of portions 262–270. The core portion 272 can have, but need not have, substantially the same propagation velocity for the acoustic wave throughout the portion 272.

One or more of the size, spacing and arrangement of plurality of portions 262–270 can be patterned or random. The core 245 can have substantially the same optical index of refraction throughout, such that the optical properties (other than SBS properties, which is implicit) of the fiber are substantially unchanged by the presence of the plurality of longitudinally extending portions 262–270. Providing a distribution of propagation velocities, which in the embodiment shown in FIG. 4 is accomplished at least in part via the inclusion of the scattering portions 262–270, can diminish the vector component of the acoustic wave in the propagation direction and correspondingly lower the intensity of the Stokes wave.

The difference in propagation velocities between that of core portion 272 and the plurality of scattering portions 262–270 can be obtained by appropriately doping the scattering portions with materials which either increase or decrease the acoustic velocity of glass, with the doping or non-doping of the basic material of the core 245 and of the material of the scattering portions 262–270 also being such that the index of optical refraction of the scattering portions 262–270 is the same as that of the basic material. Preferably, the material of the entire core 245, including the scattering portions 262–270, is silica based. Ge, P, Ti and Al increase the optical index of refraction of silica, but Al raises the propagation velocity of silica for an acoustic wave associated with SBS, while other common dopants lower it, as one of ordinary skill is aware. See Table 1 below, in addition to C. K. Jen et al., "Role of guided acoustic wave properties in single-mode optical fibre design", Electronics Letters, Vol. 24, No. 23, pp. 1419–1420, Nov. 10, 1988.

TABLE 1

Effect of various dopants on the index of refraction and acoustic velocities

|  | Ge | P | Ti | B | F | Al |
|---|---|---|---|---|---|---|
| $\Delta n$/wt % Index Change | +0.056 | +0.020 | +0.23 | −0.033 | −0.31 | +0.063 |
| $\Delta v_{as}$/wt % (Shear Wave) | −0.49 | −0.41 | −0.45 | −1.18 | −3.1 | +0.21 |
| $\Delta v_{al}$/wt % (Longit. Wave) | −0.47 | −0.31 | −0.59 | −1.23 | −3.6 | +0.42 |

With reference to FIG. 4, note that the distribution of the propagation velocities of the core of the fiber 220 is azimuthally asymmetric, as the vector r, if swept in the azimuthal plane from $r_1$ to $r_2$, encounters portion 264 at $r_1$ and portion 272 at $r_2$, and the propagation velocity for an acoustic wave associated with SBS is not substantially the same for portions 264 and 272.

The size, number and separation of the scattering portions 262–270 can affect the efficiency of scattering of the acoustic waves and the SBS suppression. An optical fiber can have a phonon damping distance. Preferably there is a distance d between nearest neighbors of the scattering portions 262–270 that is less than the phonon damping distance. For example, in one embodiment of the invention, d is less than 100 microns, and can be much less than 100 microns. In a core 245 having a large diameter, such as a diameter on the order of hundreds of microns, the core can include large numbers of scattering portions.

As an example, the core 245 can consist essentially of (or consist of) silica, and the cladding 235 can comprise fluorine doped silica to achieve a NA of 0.22. In fabricating the fiber 220, a core part of a preform can include holes drilled therein, and precursors of the scattering portions, which can be rods of an appropriate composition, inserted into the holes. Collapsing this structure, such as before or when the fiber is drawn, can allow the precursor rods to fuse with the remainder of the preform. The precursor rods can comprise silica doped with aluminum or doped with both aluminum and fluorine. In another approach, a large hole may be drilled into the preform to define all or more of a core part of the preform, and several scattering precursor rods and several glass rods providing the base material of the core can be stacked within the hole. The entire assembly can then be drawn to obtain the SBS suppressed fiber.

Both methods described above, i.e., inducing changes via process variations, as well as the use of discrete elements, such as the plurality of portions 262–270, are not mutually exclusive and can be implemented in the same fiber, such as, for example, a large core multimode fiber for beam delivery. The former method can be accomplished with minimal change to the overall structure of the fiber. This change does not affect the preform fabrication process and can be implemented on existing fibers. The second method of using discrete deflection elements involves merely changing the preform fabrication process.

SBS suppression can also be accomplished by changing a diameter of the core or changing the fiber optical refractive index in the axial or longitudinal direction. The core can include an optical index of refraction that varies along the longitudinal axis. The cladding can include an optical index of refraction that varies along the longitudinal axis. Both of the core and the cladding can include optical indices of refraction that vary along the longitudinal axis, where the indices vary such that the optical index of refraction profile of the core relative to the cladding remains substantially the same along the longitudinal axis of the fiber. The tension under which the fiber is drawn also affects the residual strain in the core and hence the SBS threshold. A 28% improvement is understood to be obtainable by linearly varying the draw tension along the axial direction.

A fiber according to the invention can include such features, though in certain circumstances fibers with changing core size, optical refractive indices or draw tension along the length (i.e., along the longitudinal axis) are less than optimal since the optical waveguide properties can also vary along the length. In addition, such techniques are not always considered manufacturing friendly as they disrupt the draw process and can prevent drawing the fiber in continuous long lengths. Coiling the fiber to induce stress has also been proposed as a method to change the acoustic phonon spectrum, and is within the scope of the invention. However, coiling can result in unacceptable bend loss and hence a drop in transmitted power in certain circumstances, in addition to the penalty of reduced mechanical reliability. It does not inherently make the fiber better suited for operation in high power regimes.

A fiber according to the invention can include a core having an outer perimeter having a diameter of at least 20 microns, at least 30 microns, at least 40 microns, at least 50 microns, or even at least 100 microns. The core can have a numerical aperture of no greater than 0.12, no greater than 0.09, no greater than 0.07, or no greater than 0.05. The numerical aperture of the core can be from 0.04 to 0.11, or from 0.05 to 0.11. The fiber can include a rare earth (atomic numbers 57–71). The rare earth can be selected so as to provide light of a first wavelength responsive to being pumped by light of a second wavelength that is different than the first wavelength. The core can comprise the rare earth, which can be, for example, ytterbium, erbium, or both ytterbium and erbium. A fiber according to the invention can have a second cladding disposed over a first cladding, where the first cladding is disposed over the core. The second cladding can have an optical index of refraction that is less than an index of refraction of the first cladding. The first cladding can be a pump cladding for receiving pump light for pumping the rare earth. The fiber can include one or more of the features described herein for addressing SBS. A fiber according to the invention having a numerical aperture as described herein, a rare earth, a core diameter as described herein, a second cladding and features that address SBS can be particularly useful in higher power lasers, amplifiers, and like devices.

Certain exemplary refractive index profiles that can be useful in fibers according to the invention are shown above. These refractive index profiles are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the MCVD process (assuming that the MCVD process is used to fabricate the optical fiber preform). Also, each of the sections of the refractive index profile corresponding to a particular part of the fiber indicates that the index of refraction is substantially constant for the part. This need not be true in all practices of the invention. As is well known in the art the index of refraction need not be constant. The index of refraction can be varied according to a predetermined function to provide a particular result. For example, it is known in the art to provide a core comprising a graded refractive index profile, where the profile corresponds to a parabola or other suitable function. As used herein, the use of open language (e.g., comprise, have, include, etc.) in conjunction with describing the index of refraction of a portion, or a propagation velocity of a portion, (e.g., a portion has an index of refraction n) does not mean that the specified feature of the portion need be constant throughout the portion.

Note that, as described herein, a first part (e.g., a cladding) being "disposed about" a second part (e.g., a core), means that the first region surrounds, at least partially, the second part. Often the first part will surround the second part, and will contact the second part.

One of ordinary skill in the art understands that a material or element can be combined with or incorporated into another material, such as host material, according to a chemical formulation that depends on materials in question. For example, when the host material is silica glass, most of the germanium is understood to be typically incorporated as $GeO_2$. Similarly, it is understood that boron is typically incorporated as $B_2O_3$. However, the invention is not limited to glass hosts or silica glass hosts, and can be practiced with other types of materials as host, such as plastics or other types of glasses, such as chalcogenide glasses or fluoride or phosphate glasses, wherein germanium or other elements are incorporated into different compounds than those specifically noted above. Stating that a fiber includes a material, such as boron, for example, means that the material is included in some form in the fiber, where it is understood that the form can be different for different fiber optic articles.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision.

What is claimed is:

1. An optical fiber having an increased threshold for the onset of Stimulated Brillouin Scattering (SBS) and a longitudinal axis, comprising:
   a core;
   a cladding disposed about said core;
   said core having a distribution of propagation velocities for an acoustic wave associated with SBS, said distribution of propagation velocities of said core for the acoustic wave being at least one of a) azimuthally asymmetric or b) longitudinally asymmetric wherein said core includes a first portion having a propagation velocity for the acoustic wave that is substantially the same throughout interposed between longitudinally spaced portions each having a propagation velocity different than that of said first portion,
   wherein said distribution of propagation velocities increases the threshold for the onset of SBS of the optical fiber.

2. The optical fiber of claim 1 wherein said distribution of propagation velocities of said core for said acoustic wave is azimuthally asymmetric.

3. The optical fiber of claim 2 wherein said distribution of propagation velocities is substantially longitudinally symmetric.

4. The optical fiber of claim 1 wherein said distribution of propagation velocities of said core for said acoustic wave is longitudinally asymmetric.

5. The optical fiber of claim 4 wherein said distribution of propagation velocities is substantially azimuthally symmetric.

6. The optical fiber of claim 1 wherein said distribution of propagation velocities is longitudinally and azimuthally asymmetric.

7. The optical fiber of claim 1 wherein said first portion is contiguous with said longitudinally spaced portions.

8. The optical fiber of claim 7 wherein said distribution of propagation velocities is substantially azimuthally symmetric.

9. The optical fiber of claim 7 wherein said distribution of propagation velocities is azimuthally asymmetric.

10. The optical fiber of claim 1 wherein said core has a diameter that is substantially the same along the longitudinal axis.

11. The optical fiber of claim 1 wherein said fiber has a relative optical index of refraction profile representative of said core relative to said cladding, and wherein said relative optical index of refraction profile is substantially longitudinally symmetric.

12. The optical fiber of claim 1 wherein at least one of the core and the cladding has an optical index of refraction that does not substantially vary along the longitudinal axis.

13. The optical fiber of claim 1 wherein said core has an optical index of refraction that is substantially the same throughout the volume of the core.

14. The optical fiber of claim 1 wherein said distribution of propagation velocities is formed at least in part by the asymmetrical transfer of thermal energy with the preform from which said fiber is drawn.

15. The optical fiber of claim 1 wherein said fiber is drawn from a preform, and wherein said distribution of propagation velocities is formed at least in part by twisting at least one of the preform and the fiber.

16. The optical fiber of claim 1 comprising a plurality of longitudinally extending portions, each of the portions having a propagation velocity of the acoustic wave that is different than the propagation velocity for the acoustic wave of the fiber material contiguous with the portion.

17. The optical fiber of claim 16 wherein there is an acoustic phonon damping distance associated with the SBS, and wherein said portions have a distance between them that is less than or equal to said damping distance.

18. The optical fiber of claim 16 wherein the portions have a distance between them, said distance being less than or equal to 500 microns.

19. The optical fiber of claim 16 wherein the portions have a distance between them, said distance being less than or equal to 250 microns.

20. The optical fiber of claim 16 wherein said portions have a distance between them, said distance being less than or equal to 100 microns.

21. A method for making an optical fiber having an increased threshold for the onset of Stimulated Brillouin Scattering (SBS), comprising:
   providing a preform having at least a core part;
   drawing a fiber from the preform, the fiber having a core corresponding to the core part of the preform and a longitudinal axis; and
   providing a distribution of propagation velocities in the core for an acoustic wave associated with SBS, said distribution of propagation velocities being at least one of a) azimuthally asymmetric or b) longitudinally asymmetric wherein the core includes a first portion having a propagation velocity that is substantially the same throughout interposed between longitudinally spaced portions each having a propagation velocity different than that of the first portion,
   wherein said distribution of propagation velocities increases the threshold for the onset of SBS of the optical fiber.

22. The method of claim 21 wherein said distribution of propagation velocities is azimuthally asymmetric.

23. The method of claim 22 wherein said distribution of propagation velocities is longitudinally asymmetric.

24. The method of claim 22 wherein said distribution of propagation velocities is substantially longitudinally symmetric.

25. The method of claim 21 wherein said distribution of propagation velocities is longitudinally asymmetric.

26. The method of claim 25 wherein said distribution of propagation velocities is substantially azimuthally symmetric.

27. The method of claim 21 wherein providing a distribution of propagation velocities includes transferring thermal energy with one or both of the preform or the fiber in at least one of an azimuthally or longitudinally asymmetric manner.

28. The method of claim 27 wherein transferring thermal energy includes cooling.

29. The method of claim 27 wherein transferring thermal energy includes providing a flow of a gas that impinges the fiber.

30. The method of claim 29 wherein the flow of gas is pulsed.

31. The method of claim 27 wherein asymmetrically transferring thermal energy includes heating.

32. The method of claim 31 wherein heating includes heating the preform for drawing the fiber from the preform.

33. The method of claim 21 wherein providing a distribution of propagation velocities includes twisting one or both of the preform and the fiber.

34. The method of claim 33 wherein twisting includes varying the rate of twist as the fiber is drawn.

35. The method of claim 33 wherein twisting includes reversing the direction of the twist as the fiber is drawn.

36. The method of claim 21 wherein providing a distribution of propagation velocities includes varying the cooling rate of the fiber drawn from the preform.

37. The method of claim 21 wherein providing a distribution of propagation velocities includes drawing the fiber from the preform using a furnace wherein the fiber is offset from the center of an aperture of the furnace.

38. The method of claim 21 wherein providing a distribution of propagation velocities includes drawing the fiber using a draw furnace having a varying wall thickness when viewed in a cross section substantially perpendicular to a longitudinal axis of the fiber.

39. The method of claim 21 wherein the core part comprises a base material and has a longitudinal axis, and wherein providing includes providing the core part with a plurality of longitudinally extending portions surrounded by the base material, the longitudinally extending portions having a different propagation velocity for the acoustic wave than the base material.

40. The method of claim 21 wherein the core of the fiber has a diameter that is substantially the same along the length of the core.

41. The method of claim 21 wherein the core of the fiber has an optical index of refraction that is substantially the same throughout the volume of the core.

42. The method of claim 21 wherein the optical index of refraction profile of the core is longitudinally symmetric.

43. A method for making an optical fiber having an increased threshold for the onset of Stimulated Brillouin Scattering (SBS), comprising:
providing a preform having at least a core part;
drawing a fiber from the preform, the fiber having a core corresponding to the core part of the preform; and
asymmetrically transferring thermal energy with at least one of the preform or the fiber,
wherein said asymmetrically transferring thermal energy step increases the threshold for the onset of SBS of the optical fiber.

44. A method for transmitting electromagnetic energy with an optical fiber so as to reduce the detrimental effects of Stimulated Brillouin Scattering (SBS) on the transmission of electromagnetic energy by the optical fiber, comprising:
drawing a length of optical fiber;
twisting at least one of the optical fiber or the preform from which the optical fiber is drawn;
providing input electromagnetic energy having an input power to the length of optical fiber for transmission by the optical fiber such that the optical fiber can provide an output electromagnetic energy having an output power, the output power being higher than it would be for the same input power if the step of twisting were not performed.

45. The method of claim 44 wherein the input electromagnetic energy has an input power that is higher than the input power threshold for the onset of SBS for a second length of fiber substantially identical to the length of fiber except that the twisting step is omitted.

46. The method of claim 45 wherein the input power is at least 2 times higher than the input power threshold for the onset of SBS.

47. The method of claim 45 wherein twisting includes twisting during the draw of the fiber from the preform.

48. The optical fiber of claim 1 wherein said core has a substantially circular outer perimeter.

49. The optical fiber of claim 2 wherein said core has a substantially circular outer perimeter.

50. The optical fiber of claim 3 wherein said core has a substantially circular outer perimeter.

51. The optical fiber of claim 6 wherein said core has a substantially circular outer perimeter.

52. The method of claim 43 wherein asymmetrically transferring thermal energy with at least one of the preform or fiber includes providing a flow of gas that impinges the fiber.

53. The method of claim 52 wherein the flow of gas is pulsed.

54. The method of claim 43 comprising twisting one or both of the preform or the fiber.

55. An optical fiber having an increased threshold for the onset of Stimulated Brillouin Scattering (SBS) and a longitudinal axis, comprising:
a longitudinally extending core;
a longitudinally extending cladding disposed about said core;
two or more longitudinally extending portions, each of said two or more longitudinally extending portions having an outer perimeter and including the area within the outer perimeter of the portion, each of said two or more longitudinally extending portions having throughout a propagation velocity for an acoustic wave that is different than a propagation velocity, for the acoustic wave, of the fiber material contiguous with the portion;
said two or more longitudinally extending portions having a distance between them that is less than an acoustic phonon damping distance associated with the SBS; and
wherein said two or more longitudinally extending portions increase the threshold for the onset of the SBS of the optical fiber.

56. The optical fiber of claim 55 including a third longitudinally extending portion having an outer perimeter and including the area within the outer perimeter of the portion, said third portion having throughout a propagation velocity for the acoustic wave that is different than a propagation velocity, for the acoustic wave, of the fiber material contiguous with the third portion, a distance between said third portion and one of said two or more portions being less than the phonon damping distance.

57. The optical fiber of claim 55 wherein said core comprises said longitudinally extending portions.

58. An optical fiber having an increased threshold for the onset of Stimulated Brillouin Scattering (SBS) and a longitudinal axis, comprising:

a longitudinally extending core;

a longitudinally extending cladding disposed about said core;

two or more longitudinally extending portions, each of said two or more longitudinally extending portions having an outer perimeter and including the area within the outer perimeter of the portion, each of said two or more longitudinally extending portions having throughout a propagation velocity for an acoustic wave that is different than a propagation velocity, for the acoustic wave, of the fiber material contiguous with the portion;

said two or more longitudinally extending portions having a distance between them that is less than 500 microns; and wherein said two or more longitudinally extending portions increase the threshold for the onset of the SBS of the optical fiber.

59. The optical fiber of claim 58 wherein said distance is less than 250 microns.

60. The optical fiber of claim 58 wherein said distance is less than 100 microns.

61. The optical fiber of claim 58 comprising a third longitudinally extending portion having an outer perimeter and including the area within the outer perimeter of the portion, said third portion having throughout a propagation velocity for the acoustic wave that is different than a propagation velocity, for the acoustic wave, of the fiber material contiguous with the third portion, a distance between said third portion and one of said two or more portions being less than the phonon damping distance.

62. The optical fiber of claim 58 wherein said core comprises said two or more longitudinally extending portions.

* * * * *